United States Patent
Cabrera et al.

(10) Patent No.: US 10,452,514 B2
(45) Date of Patent: *Oct. 22, 2019

(54) MONITORING AND ANALYSIS OF OPERATING STATES IN A COMPUTING ENVIRONMENT

(71) Applicant: Amazon Technologies, Inc., Reno, NV (US)

(72) Inventors: Luis Felipe Cabrera, Bellevue, WA (US); Eric Jason Brandwine, Haymarket, VA (US); James R. Hamilton, Seattle, WA (US); Jonathan A. Jenkins, Seattle, WA (US); Matthew D. Klein, Seattle, WA (US); Nathan Thomas, Seattle, WA (US); Pradeep Vincent, Kenmore, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/714,665

(22) Filed: May 18, 2015

(65) Prior Publication Data
US 2015/0248341 A1    Sep. 3, 2015

Related U.S. Application Data

(63) Continuation of application No. 13/461,068, filed on May 1, 2012, now Pat. No. 9,037,922.

(51) Int. Cl.
*G06F 11/00* (2006.01)
*G06F 11/34* (2006.01)
(Continued)

(52) U.S. Cl.
CPC .......... *G06F 11/3495* (2013.01); *G06F 11/07* (2013.01); *G06F 11/076* (2013.01);
(Continued)

(58) Field of Classification Search
CPC .............. G06F 11/079; G06F 11/0793; G06F 11/3006; G06F 11/3065; G06F 11/3072;
(Continued)

(56) References Cited

U.S. PATENT DOCUMENTS 6,148,407 A * 11/2000 Aucsmith ............... G06F 21/57
726/16
6,205,563 B1    3/2001 Lewis
(Continued)

OTHER PUBLICATIONS

U.S. Non-Final Office Action dated Mar. 25, 2014 issued in U.S. Appl. No. 13/461,068.
(Continued)

*Primary Examiner* — Loan L. T. Truong
(74) *Attorney, Agent, or Firm* — Hogan Lovells US LLP (57) ABSTRACT

A set of techniques is described for monitoring and analyzing crashes and other malfunctions in a multi-tenant computing environment (e.g. cloud computing environment). The computing environment may host many applications that are executed on different computing resource combinations. The combinations may include varying types and versions of hardware or software resources. A monitoring service is deployed to gather statistical data about the failures occurring in the computing environment. The statistical data is then analyzed to identify abnormally high failure patterns. The failure patterns may be associated with particular computing resource combinations being used to execute particular types of applications. Based on these failure patterns, suggestions can be issued to a user to execute the application using a different computing resource combination. Alternatively, the failure patterns may be used to modify or update the various resources in order to correct the potential malfunctions caused by the resource.

20 Claims, 8 Drawing Sheets

(51) Int. Cl.
*G06F 11/30* (2006.01)
*G06F 11/07* (2006.01)

(52) U.S. Cl.
CPC ........ *G06F 11/0709* (2013.01); *G06F 11/079* (2013.01); *G06F 11/3006* (2013.01); *G06F 11/3065* (2013.01); *G06F 11/3072* (2013.01); *G06F 11/3409* (2013.01)

(58) Field of Classification Search
CPC ..... G06F 21/554; H04L 41/069; H04L 67/10; G06N 20/00
See application file for complete search history.

(56) References Cited

U.S. PATENT DOCUMENTS

| | | | |
|---|---|---|---|
| 6,615,367 B1 | 9/2003 | Unkle et al. | |
| 6,832,341 B1 | 12/2004 | Vijayan | |
| 6,898,556 B2 | 5/2005 | Smocha et al. | |
| 7,386,839 B1* | 6/2008 | Golender | G06F 11/3636 717/127 |
| 7,467,067 B2 | 12/2008 | Marvasti | |
| 7,509,539 B1 | 3/2009 | Denefleh et al. | |
| 8,041,996 B2 | 10/2011 | Rathunde et al. | |
| 8,069,374 B2* | 11/2011 | Panigrahy | G06F 11/0709 714/38.1 |
| 8,166,351 B2 | 4/2012 | Slutsman et al. | |
| 8,245,079 B2 | 8/2012 | Hughes et al. | |
| 8,375,255 B2 | 2/2013 | Wang et al. | |
| 8,423,827 B2 | 4/2013 | Berriss et al. | |
| 8,826,033 B1* | 9/2014 | Krishnaprasad | G06F 21/554 713/187 |
| 8,862,730 B1* | 10/2014 | Hernacki | H04L 63/20 709/224 |
| 9,037,922 B1* | 5/2015 | Cabrera | G06F 11/07 714/47.1 |
| 9,088,570 B2* | 7/2015 | Anderson | H04L 67/10 |
| 9,639,338 B2* | 5/2017 | Ruehl | G06F 8/60 |
| 10,063,445 B1* | 8/2018 | Preece | H04L 43/10 |
| 2003/0018681 A1* | 1/2003 | Subramanian | G06F 9/3861 718/102 |
| 2006/0190770 A1 | 8/2006 | Harding | |
| 2007/0198609 A1* | 8/2007 | Black | G06Q 10/087 |
| 2007/0260692 A1* | 11/2007 | Burgoyne | G06Q 10/107 709/206 |
| 2008/0005141 A1* | 1/2008 | Zheng | G06F 3/0608 |
| 2008/0077358 A1* | 3/2008 | Marvasti | G06N 99/005 702/187 |
| 2009/0172688 A1* | 7/2009 | Bobak | G06Q 10/06 718/104 |
| 2010/0046809 A1* | 2/2010 | Marvasti | G06F 21/554 382/124 |
| 2010/0223499 A1* | 9/2010 | Panigrahy | G06F 11/0709 714/19 |
| 2010/0325734 A1* | 12/2010 | Etchegoyen | G06F 21/121 726/26 |
| 2011/0010560 A1* | 1/2011 | Etchegoyen | G06F 11/2025 713/189 |
| 2011/0016347 A1 | 1/2011 | Bradeur et al. | |
| 2011/0068921 A1* | 3/2011 | Shafer | G06K 7/0008 340/571 |
| 2011/0090541 A1* | 4/2011 | Harper | G06F 21/32 358/474 |
| 2011/0093503 A1* | 4/2011 | Etchegoyen | G06F 21/121 707/780 |
| 2011/0093703 A1* | 4/2011 | Etchegoyen | G06F 21/57 713/168 |
| 2011/0099200 A1* | 4/2011 | Blount | G06F 21/32 707/770 |
| 2011/0185235 A1* | 7/2011 | Iizuka | H04L 43/0882 714/47.3 |
| 2011/0185236 A1* | 7/2011 | Watanabe | G06F 11/0709 714/48 |
| 2012/0144229 A1* | 6/2012 | Nadolski | G06F 11/1484 714/4.2 |
| 2014/0156877 A1* | 6/2014 | Tylik | G06F 3/0605 710/18 |

OTHER PUBLICATIONS

U.S. Final Office Action dated Sep. 30, 2014 issued in U.S. Appl. No. 13/461,068.
U.S. Notice of Allowance dated Feb. 4, 2015 issued in U.S. Appl. No. 13/461,068.

* cited by examiner

MONITORING AND ANALYSIS OF OPERATING STATES IN A COMPUTING ENVIRONMENT

CROSS REFERENCE TO RELATED APPLICATIONS

This application is a continuation of, and accordingly claims the benefit of, U.S. patent application Ser. No. 13/461,068, filed with the U.S. Patent and Trademark Office on May 1, 2012.

BACKGROUND

As an ever increasing number of applications and services are being made available over networks such as the Internet, a number of content, application, and/or service providers are turning to technologies such as remote resource sharing and cloud computing. Cloud computing is a general term often used to describe the process of providing access to electronic resources through services, such as Web services, where the hardware and/or software used to support those services is made to be dynamically scalable to meet the needs of the services at any given time. A user or customer typically will rent, lease, or otherwise pay for access to resources through the cloud, and thus does not have to purchase and maintain the hardware and/or software to provide access to these resources. A service provider that owns those resources will usually take on the responsibility of maintaining and managing the resources, ensuring that they are highly available, scalable and otherwise ready to provide the necessary services.

In cloud computing environments, applications are usually hosted on remote server and storage devices by a service provider on behalf of various users. Large numbers of users typically share these resources and each user's application often has different configurations and attributes. As with most computing environments, the applications running on the service provider's resources may crash, fail or otherwise reach unexpected results. These failures may be caused by hardware malfunctions, software errors and various other conditions which may be related to the resources hosting the application or to the application itself. In this context, it is desirable to provide guidance to the customer or user that owns the application on how to prevent, fix or otherwise resolve these malfunctions.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with the embodiments described herein overcome various deficiencies in conventional approaches for software and hardware fault analysis. In particular, the various embodiments provide approaches for gathering statistically significant failure data in a multi-tenant computing environment (e.g. "cloud environment" or shared resource environment) and using that data to provide guidance and/or suggestions for adjusting aspects of various resources in the environment.

In accordance with various embodiments, one such approach includes a service that monitors the multi-tenant computing environment for application crashes, failures and other abnormal events. The multi-tenant computing environment may be maintained by a service provider and may host large numbers of applications on behalf of various users. Each application can be hosted on a set of resources that may include various combinations of hardware and software components needed to run the application. For example, the combination of resources running an application may include the computing device, an operating system and kernel, a virtualization layer, one or more server instances (e.g. application server or web server), databases, a load balancer, and various other resources that may be used by the user's application. In various embodiments, the service can monitor any of these or other such components of the computing environment.

In accordance with an embodiment, each resource combination may include different resources and each resource may be associated with a certain set of attributes or other metadata. For example, one resource stack in the multi-tenant computing environment may utilize a different type of operating system or a different version of the same operating system than another resource stack. Similarly, some resource stacks may include different hardware components, such as central processing unit (CPU), motherboard, memory, disk storage, and the like. As such, any given resource stack may include an independent combination of resources, associated with its own set of attributes that may indicate the number, type(s) and version(s) of the various resources contained therein. In various embodiments, the service provider has access to information about all of such resource profiles of the various resource stacks being used to run applications.

In accordance with an embodiment, the service provider can deploy a monitoring service in the multi-tenant computing environment, which monitors the various resource stacks and the applications running thereon for failures and other abnormal execution conditions. Whenever a failure is detected, the information associated with the failure can be logged by the monitoring service. Over time, the monitoring service can collect statistically significant data about the various abnormal execution conditions occurring throughout the multi-tenant computing environment. This data can be reviewed and analyzed to identify statistically significant correlations between the various abnormal execution conditions and the attributes of the resource stacks that are hosting the applications where the malfunctions occurred. In one embodiment, the service may identify failure patterns that are abnormally high. For example, an application running on a particular combination of resources may have failed a significantly larger percentage of times than the same type of application running on other combinations of resources. This failure pattern may be flagged as being statistically significant by the monitoring service.

Based on such statistical correlations, the monitoring service may generate one or more suggestions for modifying the resource stack that is hosting the application. For example, the service provider may recommend that the application be moved to a different combination of resources in order to reduce the failure rate for that application. These suggestions may be based on correlations that have been identified as being statistically more reliable (e.g. resource combinations that fail less frequently than other combinations).

In addition, the gathered statistical data can be used to determine failures occurring under identified conditions, and manufacturers, providers, or other entities associated with those resources can be provided with guidance to modify at least a respective portion of the resources based at least in part on the statistical data. For example, once certain failure patterns have been identified, the service provider may collect more detailed information about the malfunctions that have occurred. In one embodiment, a monitoring agent can be installed in the resource stack to report various core dumps, server logs or other state information that may be useful for analyzing and debugging the failures. This detailed crash data may then be provided to the manufacturer, along with some suggestions to issue software updates, fix bugs or otherwise modify the resource to reduce the occurrence of such failures.

As used throughout this disclosure, the terms malfunction, failure, crash and abnormal exit are used interchangeably and are intended to include any software or hardware error, degraded state or other result that is unexpected or otherwise deviates from the normal execution of a program. Examples of such malfunctions include but are not limited to networking faults, power outages, erroneous results, operating system crashes (e.g. "blue screens"), application exceptions, hardware defects, connection failures, and other anomalies.

Figure 1:
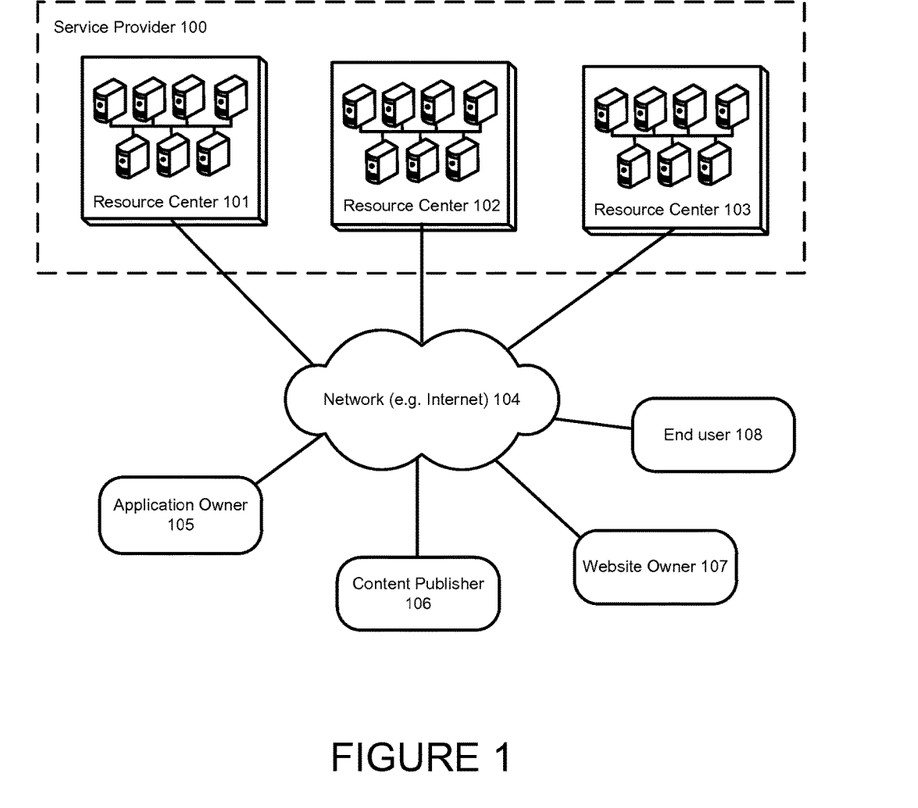
FIG. 1 is a general illustration of a service provider environment, in accordance with various embodiments.

FIG. 1 is a general illustration of an example service provider environment, in accordance with various embodiments.

As illustrated, a service provider 100 can offer to its customers a multi-tenant computing environment comprised of shared computing resources, such as physical servers/computers, virtual machines, raw (block) storage devices, firewalls, load balancers, networking equipment and a wide variety of other resources. In accordance with an embodiment, the service provider 100 can supply these shared resources on demand from its large pools installed in one or more resource centers (101, 102, 103). For wide area connectivity, a network (e.g. Internet) 104 can be used to connect and expose those resources to various users.

In accordance with an embodiment, a customer of the service provider, such as an application owner 105, content publisher 106, or website owner 107 may deploy and run their service(s) on the shared resources (e.g. servers, etc.) of the service provider 100. For example, the application owner 105 may install its operating system images as well as its application software on the physical machines located in one or more data centers of the service provider 100. In this embodiment, the customer may be responsible for maintaining the operating systems and application software. The service provider may bill on a utility computing basis, wherein the cost to the customer reflects the amount of resources consumed by the customer's particular application.

In accordance with various embodiments, the resource centers (101, 102, 103) may be provided by the service provider 100 or alternatively by one or more parties associated with the provider 100 (e.g. entities having a business relationship with the service provider). The various resource centers can include resources of the same or similar type or of different types. In accordance with an embodiment, the number of resources and/or resource centers can be scaled as necessary to support all of the customers and users of the service provider.

In accordance with various embodiments, the data centers (101, 102, 103) of the service provider can be distributed in several geographical regions and availability zones for purposes of lower latency and high availability. By way of example, availability zones can be distinct locations that are engineered to be insulated from failures in other availability zones and provide inexpensive, low latency network connectivity to other availability zones in the same region. By launching instances in separate availability zones, applications can be protected from failure of a single location. Regions may include one or more availability zones and may be geographically dispersed, and located in separate geographic areas or countries. For example, regions may include United States (US) East (Northern Virginia), US West (Oregon), US West (Northern California), EU (Ireland), Asia Pacific (Singapore), Asia Pacific (Tokyo), South America (Sao Paulo) and the like.

Figure 2:
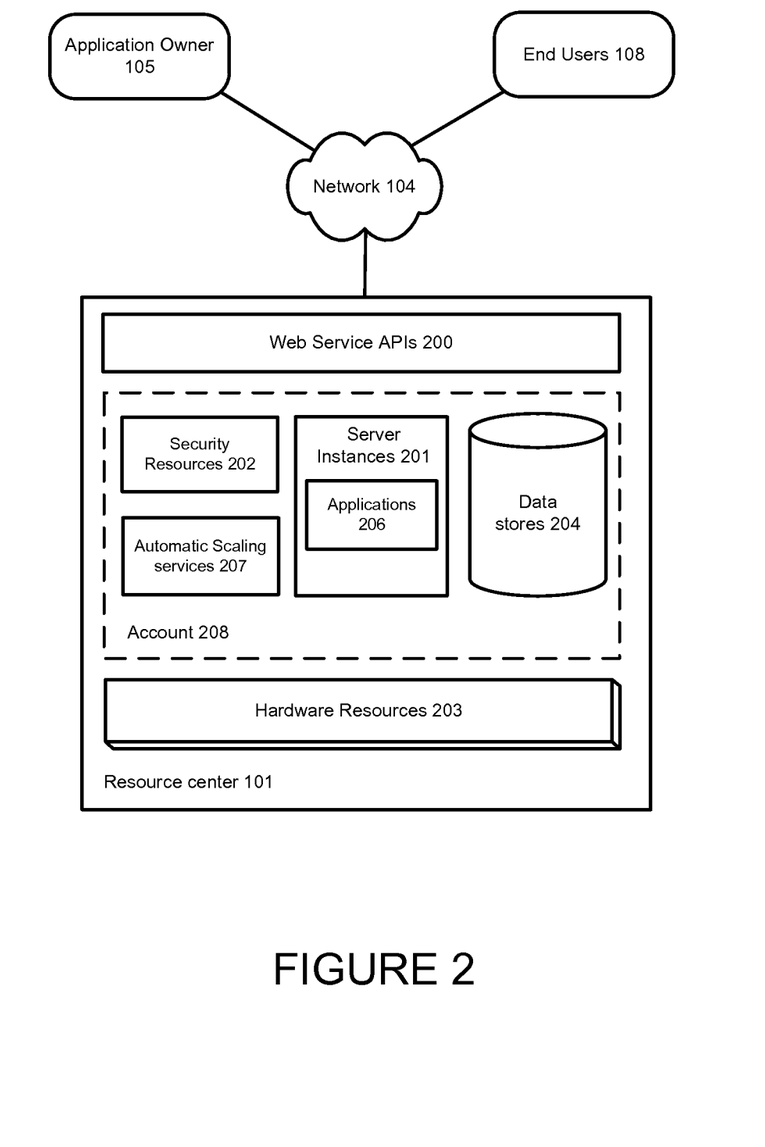
FIG. 2 is an illustration of the various resources provided by the service provider, in accordance with various embodiments.

FIG. 2 is an illustration of various resources that can be provided by a service provider, in accordance with various embodiments. As illustrated, the shared resources of the resource center 101 may include a set of physical hardware devices 203, including but not limited to computer servers, hubs, switches, bridges, racks, firewalls and other network devices. These devices are used to deploy and execute the applications 206 and services on behalf of various users (e.g. application owners 105) and to enable these applications to be made available to end users 108 on a mass scale.

The service provider 100 can supply a set of web service application programming interfaces (APIs) 200 that can be used by the application owner 105 to manage their applications and the resources being used to run the applications. The APIs 200 can provide resizable compute capacity (e.g. server capacity) on the network. For example, an application owner 105 can bundle the operating system, application software and associated configuration settings into a machine image. These machine images can then be used to provision one or more virtualized server instances 201 which will run the customer's applications 206. Additionally, the server instances 201 can be decommissioned using simple web service calls to scale capacity up and down quickly, as the capacity requirements of each application change. In certain embodiments, an automatic scaling service 207 can be configured to manage the scaling needs of the application, automatically provisioning additional server instances when the workload of the application increases and removing server instances when workload decreases.

In accordance with one embodiment, each of the server instances 201 is a virtual server instance assigned as a unit of compute capacity to the application owner 105 and used by the service provider to measure the hardware resource 203 consumption. In accordance with alternative embodiments, the server instances 201 may be the actual physical devices that run the applications 206 on behalf of the customer.

In various embodiments, the service provider 100 may provide server instances 201 on a per-hour charging basis, for one-time payment or create a market place for customers bid for unused capacity of the various server instances. Instances 201 can be launched in one or more geographical regions. Each region may have multiple availability zones which are distinct locations that are engineered to be insulated from failures in other availability zones.

In accordance with an embodiment, each server instance 201 may be assigned a role at boot time. For example, an instance can be designated a database server, an application server, a slave server and the like. The role may be passed in as an argument during launch that instructs the server instance to perform a sequence of steps after it has booted. On boot, a server instance can retrieve the necessary resources (e.g. code, scripts, configuration, etc) based on the role assigned to it and the instance can attach itself to a cluster to serve its function (e.g. execute the application).

In accordance with an embodiment, each application owner 105 can be assigned an account 208 by the service provider. The account 208 can contain all of the resources utilized by the application owner, including server instances 201, data stores 204 (e.g. databases, content management systems, etc.), security resources 202 (e.g. policies, groups, user identities, etc.), scaling services 207 and the like. The account can be a secured account, wherein access to it is controlled and restricted to a selected group of users that may access and manipulate the various resources of the account.

Figure 3:
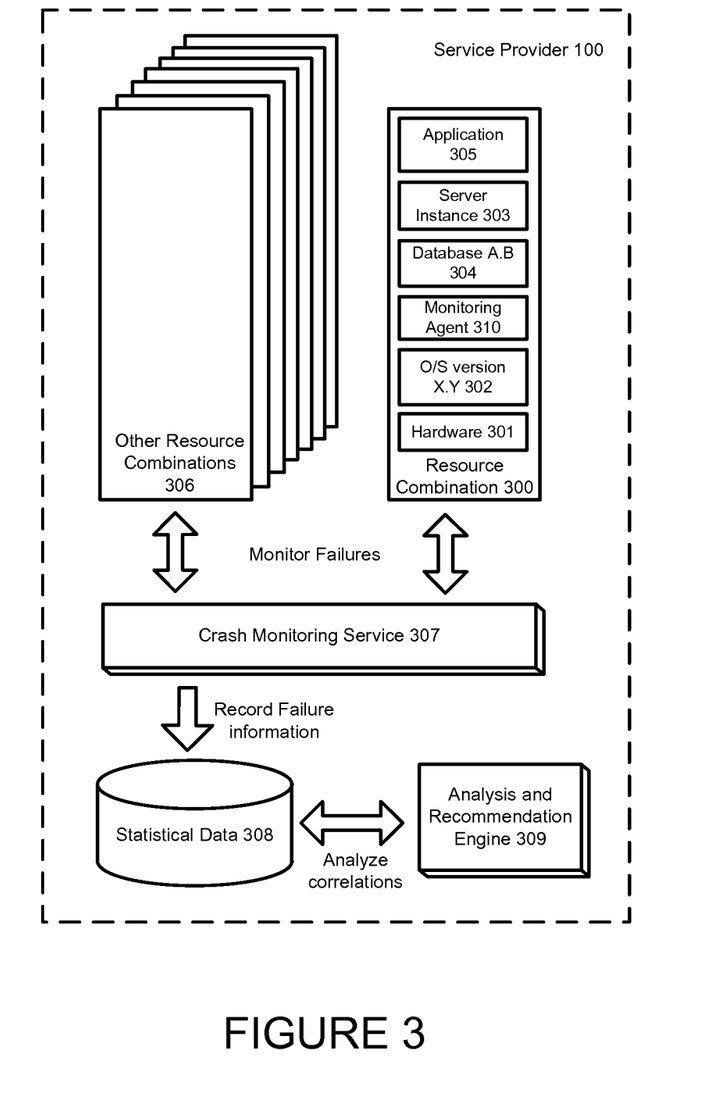
FIG. 3 illustrates an example of a monitoring service that monitors the computing environment for failures, in accordance with various embodiments.

FIG. 3 illustrates an example of a monitoring service that monitors the computing environment for failures, in accordance with various embodiments. It should be understood, however, that monitoring for failures is merely an example, and that a monitoring service can monitor a computing environment for various other types of events or occurrences as well within the scope of the various embodiments.

In the illustrated embodiment, an application 305 may be deployed and executed on a particular resource stack (e.g. combination of resources). In accordance with an embodiment, the service provider 100 may utilize a variety of different resource combinations 306 for hosting the various applications on behalf of its users. For example, the resource combination 300 for hosting application 305 may include hardware resources 301, an operating system (OS) of a specific type and version 304 (e.g. Linux™ Version 4.0), a database 303 of a type/version (e.g. Oracle Database version 11.2.0.1) and one or more server instances 303 of a particular type and version. Other applications or other instances of the application 305 may be hosted on other resource combinations 306 which may have different resources, or different types, implementations or versions of the same resource. In accordance with an embodiment, the service provider 100 may centrally store and maintain information about the various resource profiles and combinations used to run the applications.

In accordance with the illustrated embodiment, a monitoring service 307 can continuously (or periodically) monitor the various resource combinations (300, 306) for failures or other abnormal execution conditions. For example, the monitoring service 307 may detect any abnormal exits (e.g. application crashes) or "blue screens" (e.g. operating system crashes) and record those occurrences as statistical data 308. In various alternative embodiments, any malfunction or unexpected result may be detected and recorded. The monitoring service may implement a variety of techniques to detect the failure, such as periodically pinging the various resources for responses, implementing health checks, or other means as known in the art.

In accordance with an embodiment, once a sufficient amount of statistical data 308 has been gathered over time, the data 308 can be analyzed to identify abnormally high failure patterns. An analysis and recommendation engine 309 may be implemented to periodically analyze the statistical data 308 and determine some correlations between a failure and a particular combination of resources used to run an application type. Given the mass scale of the multi-tenant computing environment, these correlations can be statistically significant indications of some underlying issue involved the interaction between the various resources involved or some other unknown problem. For example, the analysis engine 309 may determine that applications of a specific type or having specific attributes (e.g. graphics-intensive applications) being run on a particular resource combination (e.g. small server instance executing on Intel™ CPU running OpenSolaris™ and having 1.7 GB of memory) failed at least 80% more times than the same type of application being run on other combinations of resources. Based on this correlation, the analysis engine may infer that this combination of resources is not well suited for running the particular application type and generate a suggestion to move the application to a different resource stack or to modify the resources in some manner (e.g. download a software update for the operating system, etc.). In alternative embodiments, even if the amount of collected data is not statistically significant, a set of fingerprint information may be gathered about the failure and matched to at least one other failure pattern that has occurred in the multi-tenant computing environment. For example, during a kernel crash, the service provider may obtain a stack trace that serves as a definitive fingerprint of the problem that has caused the crash and the fingerprint can be matched to another crash that has occurred in order to generate a suggestion for the customer if a known software update is available. In various embodiments, once the modification or change is determined, the suggestion may then be provided to the user that owns the identified application so that they can take the appropriate measures to improve performance of their application. In alternative embodiments, instead of making recommendations or suggestions, the system may merely publish the statistical performance characteristics to the users to enable them to make more educated decisions about selecting their resources for running the application. In other embodiments, the system may use the information to determine application placement, i.e. when selecting which resources a particular application should be executed on. For example, if the particular application type is known to be associated with higher failure patterns on a particular combination, the application could be placed on a different or modified stack when deploying the application.

In addition, once the abnormally high failure pattern has been identified, the service provider 100 may collect more detailed crash related information from the combinations of resources that have been associated with the failure pattern. For example, the monitoring agent 310 may be installed in some location of the resources stack and this monitoring agent may collect and report a snapshot of the system state at the time of the crash, any core dumps, application state, thread count, memory usage or other information that may help to analyze the failure. All of this information may be stored in a central location and later be provided to manufacturers of various resources, analyzed to modify or fix certain resources, or utilized in some other manner.

In accordance with an embodiment, the analysis engine 309 may also identify correlations between applications and resource combinations that perform particularly well (e.g. crash substantially less frequently than other combinations used to run the application type). This information may be used when generating the suggestion to move the application to a particular resource stack. For example, if a user has deployed their application on a resource stack that has been associated with an abnormally high failure pattern, the system may issue a recommendation to move the application to a different resource combination and may also suggest that a particular resource combination has been shown to be particularly well suited to handle the type of application that the user is running.

It should be noted that although FIG. 3 illustrates the monitoring service 307 and the analysis/recommendation engine 309 as being separate components, this is not intended to be a limitation to all embodiments. It will be evident to one of ordinary skill in the art that in various alternative embodiments, the monitoring, analyzing and generating recommendations can be performed by a single object or service, or may be distributed among a larger number of components (e.g. three or more).

Figure 4:
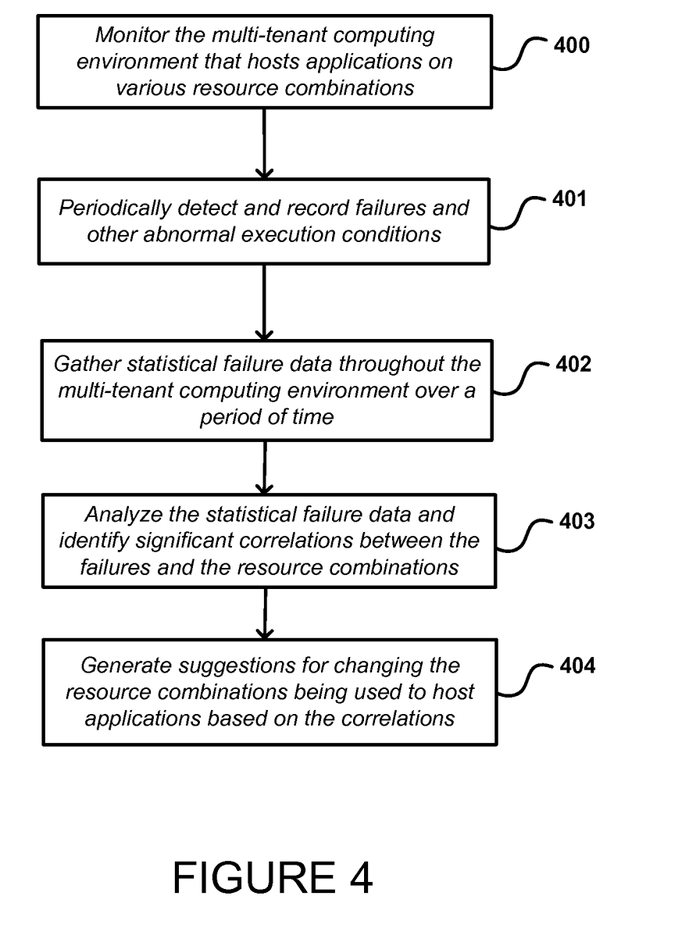
FIG. 4 illustrates an example process for monitoring and analysis of failures, in accordance with various embodiments.

FIG. 4 illustrates an example process for monitoring and analysis of failures, in accordance with various embodiments. Although this figure, as well as any other process illustrations contained in this disclosure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 400, a monitoring service may monitor the multi-tenant computing environment for failures or other malfunctions. The multi-tenant environment may host a plurality of applications on different resource combinations. For example, the resource combinations may include a stack comprising the hardware, a machine image, an operating system, virtualization layer, database, server software, and/or communication service used to run the application. In various embodiments, a machine image may include the software information to needed to configure and execute an application on a given stack of resources. For example, the machine image may include an operating system, information specifying a number of processors that the application will use, the amount of memory the application will need and other application configuration data. In various embodiments, the machine image can be used to launch a plurality of instances of the application and its associated resource stack configuration in the shared resource computing environment.

In operation 401, the monitoring service may periodically detect failures or other abnormal execution conditions occurring in the environment. For example, the monitoring service may detect operating system crashes or abnormal exits by a monitored application. In accordance with an embodiment, every time the monitoring service detects an abnormal execution condition, the monitoring service may log or otherwise record the occurrence of such condition. In addition, the service may record information about the type or characteristics of the application that was involved in the failure and the particular resource combination that was used to run the application.

In operation 402, the monitoring service may gather statistical data about the failures occurring throughout the multi-tenant computing environment over a period of time. Given the large numbers of applications and resources residing in the computing environment, the data may contain statistically significant information that may be analyzed for various patterns and tendencies.

In operation 403, the service provider system may analyze the statistical data and identify significant correlations between the failures occurring with abnormally high frequencies and the attributes of the resource stack and application running on the stack. For example, the system may identify that a certain application type running on a certain combination of resources failed substantially more frequently (higher than a predetermined threshold frequency) than other resource combinations executing similar applications.

In operation 404, based at least in part on these correlations, the system may generate a suggestion for modifying the resources or switching the application to run on a different resource combination. For example, the system may determine which users or customers are running similar applications on the identified resource combination and contact these customers with a recommendation to alter their execution environment. Alternatively, the system may publish the information about the abnormally high failure patterns to the users that own the various applications on the system. As another example, the service provider may contact the manufacturers or producers of the various resources and request them to update or modify the resources to correct the issue.

Figure 5:
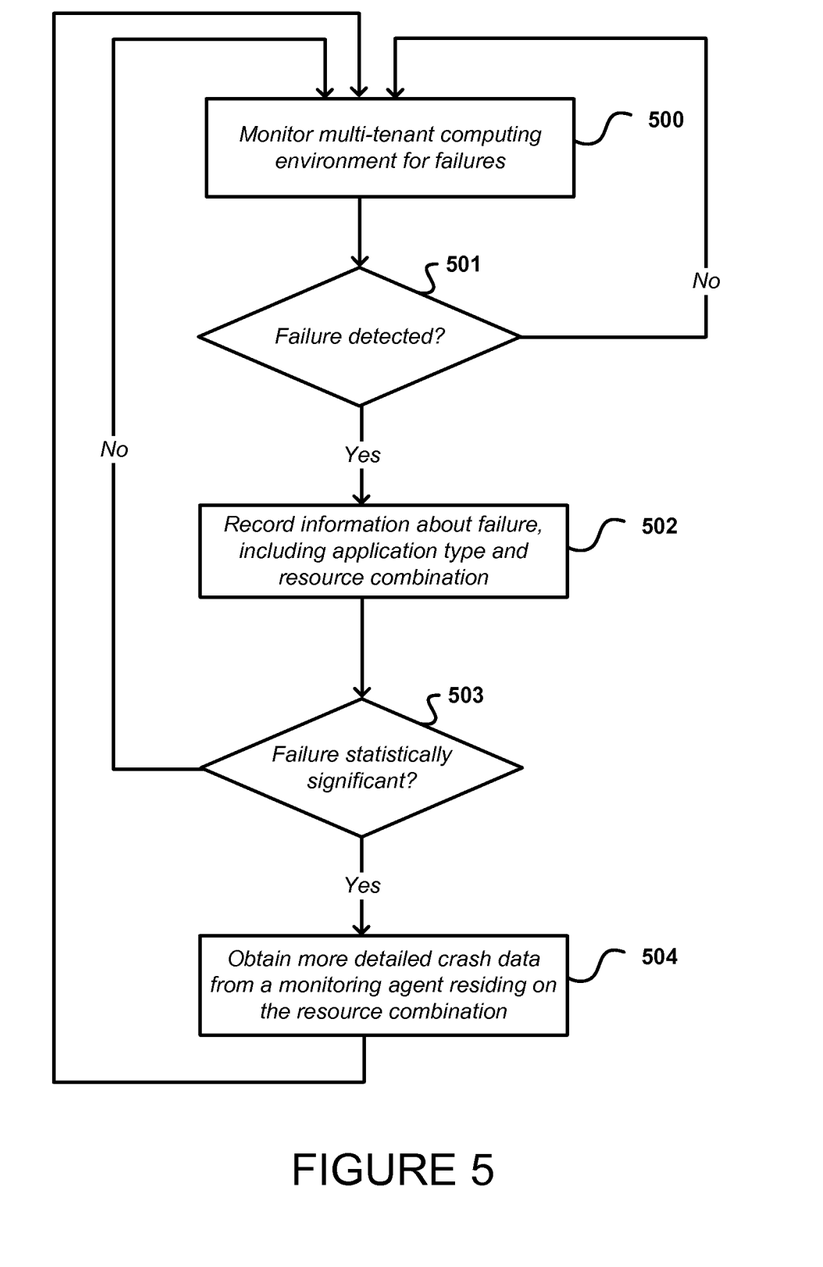
FIG. 5 is an example logical flow chart of the functions that may be performed by the monitoring service, in accordance with various embodiments.

FIG. 5 is an example logical flow chart of the functions that may be performed by the monitoring service, in accordance with various embodiments.

In operation 500, the monitoring service continuously monitors the multi-tenant computing environment and the various resources and applications executing therein for failures. If a failure is detected (operation 501), the monitoring service records information about the failure, as shown in operation 502. As part of recording the failure, the monitoring service may also store information about the various attributes of the application(s) involved in the failure, as well as the particular combination of resources that were being used to execute the application(s).

In operation 503, the monitoring service can determine whether the detected failure corresponds to a statistically significant failure pattern, which may have been previously identified. If the failure is not statistically significant, the monitoring service may continue monitoring the computing environment for other failures once it has finished recording the failure. If, on the other hand, the failure is deemed statistically significant, the system may obtain more detailed set of crash data about the failure, as shown in operation 504. In one embodiment, this detailed data may be obtained from a monitoring agent that has been installed on the resource combination. The monitoring agent may be responsible for providing snapshots of state information, core dumps and other information about the failure to the monitoring service. Once this detailed crash data is obtained, it can be recorded and the monitoring service may continue monitoring the computing environment.

Figure 6:
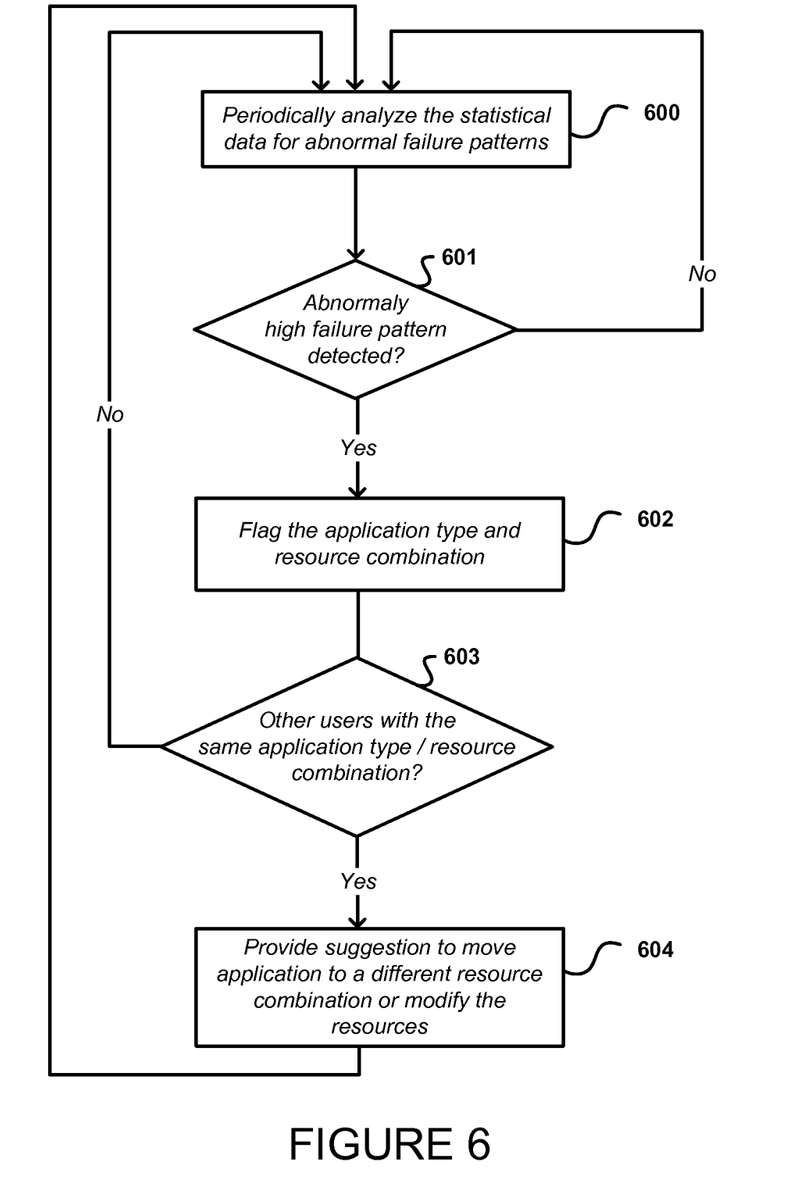
FIG. 6 is an example logical flow chart of the functions that may be performed by the analysis and recommendation engine, in accordance with various embodiments.

FIG. 6 is an example logical flow chart of the functions that may be performed by the analysis and recommendation engine, in accordance with various embodiments.

In operation 600, the analysis engine may periodically analyze historical data gathered by the monitoring service for abnormal failure patterns. For example, the analysis engine may look for statistically significant correlations between failures and the resource combinations used to execute particular application types. In particular, the analysis engine may inspect certain application characteristics (e.g. workload of the application, typical number of open connections used by the application, memory footprint of the application, amount of database access utilized by the application, CPU utilization, thread count, average requests, network traffic handled by the application such as packet size, and the like).

In operation 601, the analysis engine may detect an abnormally high failure pattern. If the analysis engine detects such a failure pattern, the analysis engine may flag the resource combination as potentially not well suited for running the particular application type involved in the failure (operation 602). This may be performed by recording the information about the failure pattern and the resource combination in a log or some other storage location.

In operation 603, the analysis engine can determine whether there are any other users that may be running similar applications on the same resource combination. If there are such other users, the system may contact those users and provide them with a suggestion to move their application to a different resource stack, as shown in operation 604. In some embodiments, this may be performed by allowing the users to subscribe to a notification service that notifies the user of such potential changes. Alternatively, the system may generate an electronic mail (email) message to the user, or contact the users in some other manner. Yet in alternative embodiments, the system may simply publish information about the failure patterns to all users of the system in order to enable them to optimize their decision making process.

Figure 7:
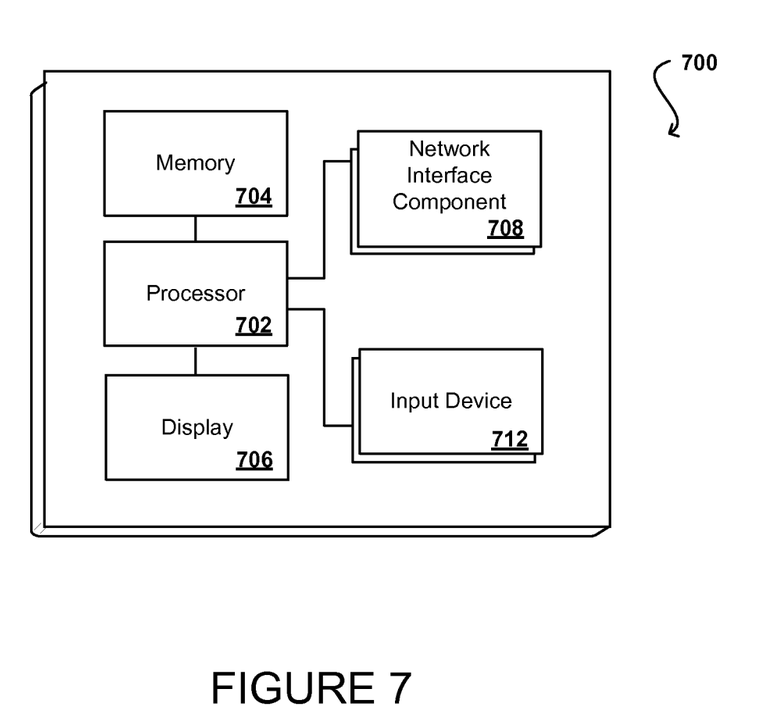
FIG. 7 illustrates a logical arrangement of a set of general components of an example computing device that can be utilized in accordance with various embodiments.

FIG. 7 illustrates a logical arrangement of a set of general components of an example computing device 700. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments will include at least one input element 708 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 700 of FIG. 7 can include one or more network interface elements 708 for communicating over various networks, such as a Wi-Fi, Bluetooth, RF, wired, or wireless communication systems. The device in many embodiments can communicate with a network, such as the Internet, and may be able to communicate with other such devices.

Figure 8:
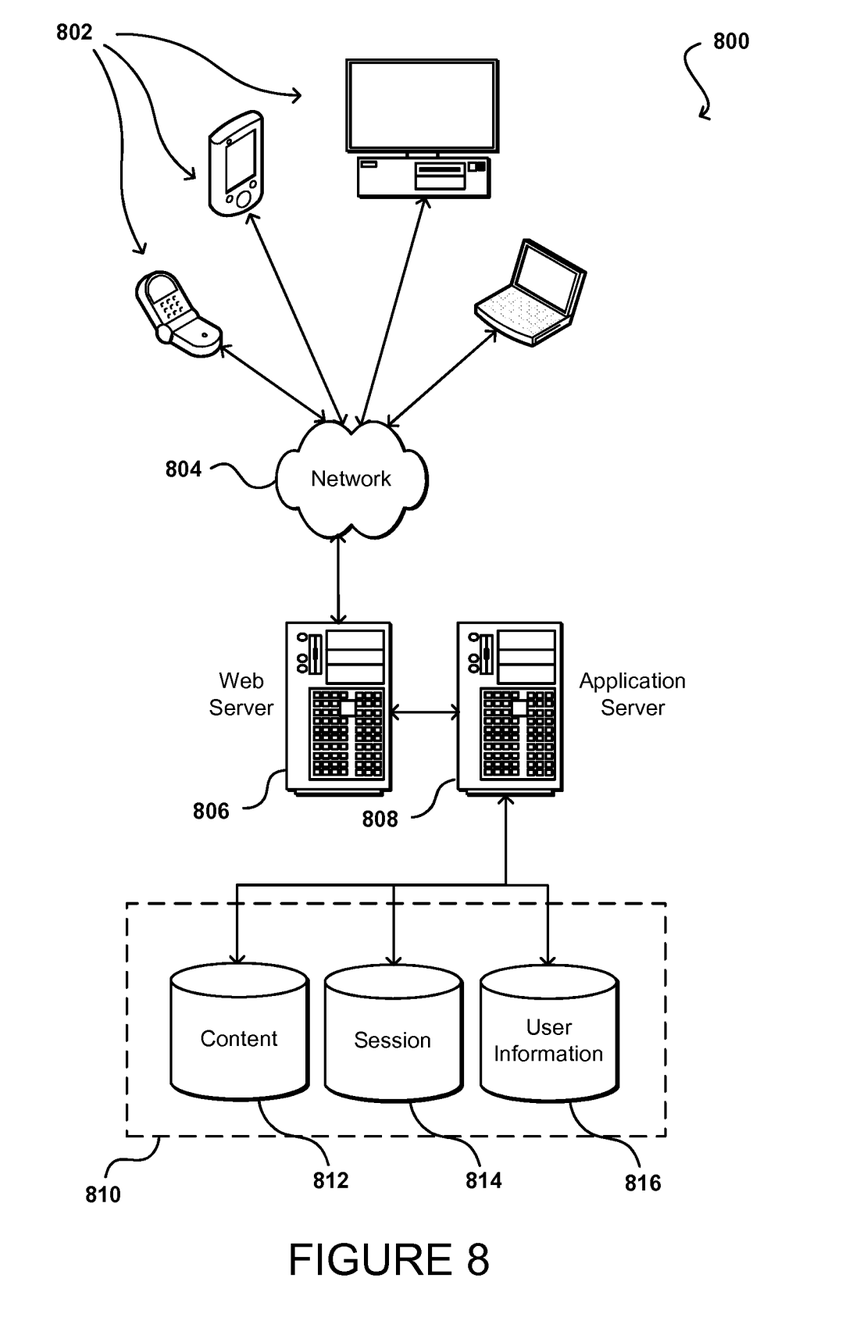
FIG. 8 illustrates an example of an environment for implementing aspects in accordance with various embodiments.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    collecting, over a period of time, performance data for a plurality of devices hosting applications in a multi-tenant environment, the applications including at least a first application using a first configuration of devices from the plurality of devices in the multi-tenant environment;
    determining, using the performance data, that the first application experienced a malfunction;
    generating a first fingerprint for the first application and the first configuration of devices,
    comparing the first fingerprint to a set of fingerprints generated for the plurality of devices hosting the applications in the multi-tenant environment;
    identifying one or more matching fingerprints, of the set of fingerprints, that match the first fingerprint for the first application; and
    causing the first application to execute using a second configuration of devices from the plurality of devices in the multi-tenant environment.

2. The computer-implemented method of claim 1, further comprising:
    determining information that includes at least one of a number of devices for the first configuration of devices, a set of types of the devices, respective hardware and software for each of the devices, a specific combination of the devices, interconnection of the devices, configuration of the devices with respect to each other, or individual configuration data for each of the devices of the first configuration of devices.

3. The computer-implemented method of claim 1, further comprising:
    determining information about the first application, the information including at least one of a type of the application, a version of the application, or a set of attributes of the application.

4. The computer-implemented method of claim 1, wherein an amount of correlation data between the first fingerprint and the one or more matching fingerprints is not statistically significant.

5. The computer-implemented method of claim 1, further comprising:
    notifying a provider of the first application about the malfunction and providing at least information about the first fingerprint.

6. The computer-implemented method of claim 1, wherein the first configuration of devices in the multi-tenant environment includes two or more of a set of hardware devices with at least an operating system, a machine image, a server instance, a database instance, a load balancer, a security group, a subscription service, or a notification service.

7. A computer-implemented method, comprising:
    monitoring performance data for a plurality of devices hosting applications executing in a multi-tenant environment;
    detecting an abnormal execution condition for an application of the applications;
    determining fingerprint information for the application and a first combination of devices of the multi-tenant environment used for execution of the application;
    comparing the fingerprint information to information for at least one other abnormal execution condition, detected in the multi-tenant environment, to identify a malfunction pattern; and
    publishing information associated with the malfunction pattern to one or more users associated with the application.

8. The computer-implemented method of claim 7, further comprising:
    causing the application to execute using a second combination of devices in the multi-tenant environment.

9. The computer-implemented method of claim 7, further comprising:
    determining the information for the first combination of devices, the information including at least one of a number of devices, a set of types of devices, respective hardware and software for each of the devices, interconnection of the devices, configuration of the devices with respect to each other, or individual resource configuration data for each of the devices of the first configuration of devices.

10. The computer-implemented method of claim 7, further comprising:
    notifying a provider of the application about the malfunction pattern.

11. The computer-implemented method of claim 7, further comprising:
    detecting a new occurrence of the abnormal execution condition that corresponds to the malfunction pattern, the new occurrence detected with respect to a separate instance of the application executing on a third combination of devices in the multi-tenant environment;
    obtaining crash data from the third combination of devices used to execute the separate instance, the crash data including one or more of a core dump, server logs, memory utilization, CPU utilization, thread count, or application state information; and
    storing the crash data as information about the abnormal execution condition associated with the malfunction pattern.

12. The computer-implemented method of claim 11, further comprising:

updating the information for the malfunction pattern based at least in part upon the crash data.

13. The computer-implemented method of claim 7, wherein the abnormal execution condition includes at least one of an abnormal exit by the application, an operating system crash, or an unexpected computing result.

14. A system, comprising:
at least one processor; and
memory including instructions that, when executed by the at least one processor, cause the system to:
gather statistical performance data associated with operating states that occur in a shared resource environment, the shared resource environment executing a plurality of applications using a plurality of combinations of devices;
identify, using the statistical performance data, a sub-optimal state associated with a devices combination being used to execute a type of application of the plurality of applications;
determine a fingerprint for the devices combination and the type of application;
detect another occurrence of the sub-optimal state in the shared resource environment, first information for the occurrence matching second information of the fingerprint;
determine that the fingerprint corresponds to a malfunction pattern of sub-optimal operation; and
adjust at least one aspect of at least one device of the devices combination based at least in part upon the malfunction pattern.

15. The system of claim 14, wherein the instructions when executed further cause the system to:
publish third information associated with the malfunction pattern to at least one of a user or a provider of the application.

16. The system of claim 14, wherein the instructions when executed further cause the system to:
detect a new occurrence of the sub-optimal state that corresponds to the malfunction pattern; and
update third information for the malfunction pattern based at least in part upon the data obtained with respect to the new occurrence.

17. The system of claim 14, wherein gathering the statistical performance data includes at least one of pinging devices of the combinations of devices, implementing health checks on the devices, or requesting state data for the devices.

18. The system of claim 14, wherein adjusting at least one aspect of at least one device of the devices combination includes at least one of changing an attribute, a type, a configuration, or a connection of the at least one device.

19. The system of claim 14, wherein the devices combination includes two or more of a set of hardware devices with at least an operating system, a machine image, a server instance, a database instance, a load balancer, a security group, a subscription service, or a notification service.

20. The system of claim 14, wherein the instructions when executed further cause the system to:
determine information statistical performance data including at least one of a number of devices, a set of types of devices, respective hardware and software for each of the devices, a specific combination of the devices, interconnection of the devices, configuration of the devices with respect to each other, or individual resource configuration data for each of the devices.

* * * * *